(12) United States Patent
Ishioka

(10) Patent No.: US 7,897,531 B2
(45) Date of Patent: Mar. 1, 2011

(54) GLASS

(75) Inventor: Junko Ishioka, Sagamihara (JP)

(73) Assignee: Kabushiki Kaisha Ohara, Sagamihara-shi (JP)

( * ) Notice: Subject to any disclaimer, the term of this patent is extended or adjusted under 35 U.S.C. 154(b) by 68 days.

(21) Appl. No.: 11/795,297

(22) PCT Filed: Jan. 12, 2006

(86) PCT No.: PCT/JP2006/300677

§ 371 (c)(1),
(2), (4) Date: Jul. 16, 2007

(87) PCT Pub. No.: WO2006/075785

PCT Pub. Date: Jul. 20, 2006

(65) Prior Publication Data

US 2008/0254965 A1  Oct. 16, 2008

(30) Foreign Application Priority Data

Jan. 17, 2005 (JP) ................................ 2005-009266

(51) Int. Cl.
C03C 3/068 (2006.01)
C03C 3/064 (2006.01)
C03C 3/062 (2006.01)
C03C 3/066 (2006.01)

(52) U.S. Cl. .................. 501/78; 501/73; 501/77; 501/79

(58) Field of Classification Search .................... 501/73, 501/77, 78, 79
See application file for complete search history.

(56) References Cited

U.S. PATENT DOCUMENTS

| | | | |
|---|---|---|---|
| 3,898,093 A | 8/1975 | Faulstich et al. | |
| 4,084,978 A | 4/1978 | Sagara et al. | |
| 4,612,295 A * | 9/1986 | Sagara | 501/51 |
| 4,742,028 A * | 5/1988 | Boudot et al. | 501/78 |
| 6,413,894 B1 * | 7/2002 | Sato | 501/77 |
| 2006/0105900 A1 * | 5/2006 | Kasuga et al. | 501/78 |

FOREIGN PATENT DOCUMENTS

| | | |
|---|---|---|
| DE | 2824982 C3 | 12/1979 |
| DE | 4210011 C1 | 7/1993 |
| EP | 0227269 A | 7/1987 |
| JP | 59-050048 A | 3/1984 |
| JP | 6-24789 A | 2/1994 |
| WO | WO 99/19266 A | 4/1999 |
| WO | WO 02/072491 A | 9/2002 |

OTHER PUBLICATIONS

International Search Report of PCT/JP2006/300677, date of mailing Jul. 6, 2006.
Translation of Chinese Office Action dated Mar. 1, 2010, issued in corresponding Chinese Patent Application No. 20068002489.x.
Translation of Germany Office Action dated Jun. 17, 2009, issued in corresponding Germany patent Application No. 112006000203.1.

* cited by examiner

Primary Examiner — Karl E Group
Assistant Examiner — Noah S Wiese
(74) Attorney, Agent, or Firm — Westerman, Hattori, Daniels & Adrian, LLP

(57) ABSTRACT

Glass has optical constants of a refractive index (nd) of 1.79 or over and an Abbe number (vd) of 27 or over and a specific gravity (D) of 3.20 or over and is free from devitrification in the interior of the glass in a reheat test. The glass has chemical durability according to the Powder Method (acid-proof property RA according to the Powder Method) which is Class 1.

14 Claims, No Drawings

GLASS

TECHNICAL FIELD

This invention relates to glass and, more particularly, to an optical glass such a $SiO_2$—$TiO_2$—$La_2O_3$ optical glass which has optical constants of a refractive index (nd) of 1.79 or over and an Abbe number (vd) of 27 or over and is suitable for use as optical elements such as prisms, lenses including a lens for an optical pick-up and a lens for spectacles and optical substrates such as a reflecting plate, a diffusing plate, a polarizer and a cover glass.

BACKGROUND OF THE INVENTION

As performances of optical elements for IT instruments such, for example, as a digital still camera, digital video camera, a television camera for making a high-definition television and a projector have recently been developed remarkably, various possibilities of optical design have been proposed for improving optical properties of optical instruments which are attributable to refractive index and dispersion of refractive index as represented by chromatic aberration. There is, however, the problem that a sufficient lens element, i.e., optical glass, for realizing such optical design has not been provided by the market yet. Therefore, in the prior art products, a desired optical property has to be sacrificed or, alternatively, such optical property has to be realized by carrying out processing for achieving a complicated shape of lens or by adopting a complex combination of lenses, i.e., increasing the number of lenses used. In any case, such optical design has to be realized at the cost of either optical property or productivity and manufacturing cost.

Particularly, no sufficient optical glass having a refractive index (nd) of 1.79 or over and an Abbe number (vd) in the vicinity of 30 has been provided so far for reasons that (1) such optical glass usually devitrifies, i.e., loses transparency during reheating processing such as reheat pressing, (2) such optical glass generally has poor chemical durability and, as a result, it requires a special care in handling after polishing and (3) the specific gravity of the glass is large and, therefore, weight of a final product is impermissibly large.

Known in the art of the optical glass having a refractive index (nd) of 1.79 or over and an Abbe number (vd) of 27 or over are a $SiO_2$—$B_2O_3$—$La_2O_3$—$Nb_2O_5$—$ZrO_2$—$TiO_2$—RO (R being an alkaline earth metal element) optical glass as disclosed in Japanese Patent Application Laid-open Publication No. Sho 59-50048, a $SiO_2$—$TiO_2$—$Nb_2O_5$—$R_2O$ (R being an alkali metal element) optical glass as disclosed in Japanese Patent Application Laid-open Publication No. 2002-87841, a $SiO_2$—$B_2O_3$—CaO—$TiO_2$—$Nb_2O_5$ optical glass as disclosed in Japanese Patent Application Laid-open Publication No. Hei 3-5340, and a $SiO_2$—$B_2O_3$—$La_2O_3$—$TiO_2$—$Nb_2O_5$ optical glass as disclosed in Japanese Patent Application Laid-open Publication No. 2004-18371.

The optical glass disclosed in Japanese Patent Application Laid-open Publication No. Sho 59-50048 satisfies the required optical constants but has such a large specific gravity that weight of the lens becomes large and therefore is not suitable for practical purposes. Moreover, since this optical glass has a strong tendency toward devitrification, when a lens is produced from this optical glass by reheat pressing, special reheating conditions are required. Hence, a lens cannot be produced from this optical glass by reheat pressing but it must be produced by using a grinding and polishing process.

In the optical glass disclosed by Japanese Patent Application Laid-open Publication No. 2002-87841, Abbe number relating to dispersion of refractive index is less than 27. Optical glasses in this region of Abbe number have been supplied in the past but are not sufficient from the standpoint of expanding degree of freedom in the optical design. Moreover, since this optical glass contains a large amount of alkali metal oxide, it has a strong tendency toward devitrification in reheat pressing and, further, there are problems of fusion of the glass to a mold and deterioration in durability of the mold due to solving out of alkali.

Japanese Patent Application Laid-open Publication No. Hei 3-5340 and Japanese Patent Application Laid-open Publication No. 2004-18371 disclose borosilicate lanthanum oxide optical glasses. These optical glasses, however, contain a large amount of boric acid and hence insufficient in chemical durability, particularly in water-proof and acid-proof properties. Care must be taken, therefore, in handling the glass after it has been polished to a desired shape such as a lens or prism with resulting decrease in productivity.

It is, therefore, an object of the present invention to provide, at a small manufacturing cost and a minimum burden to the environment, glass and an optical element having optical constants of a refractive index (nd) of 1.79 or over and an Abbe number (vd) of 27 or over, being free from devitrification and opaqueness in the interior of the glass when the glass is molded by a manufacturing process requiring reheating such as reheat pressing, and having excellent chemical durability.

DISCLOSURE OF THE INVENTION

Studies and experiments made by the inventor for achieving the above described object of the invention have resulted in the finding, which has led to the present invention, that desired optical constants can be realized in a $SiO_2$—$TiO_2$—$La_2O_3$ optical glass without using PbO and $As_2O_3$ which are detrimental to the environment and this glass is free from devitrification and opaqueness in the interior of the glass in a reheat test simulating reheat pressing and a desired optical glass and optical element can be provided at a small manufacturing cost in terms of glass materials, glass melting and processing of the glass.

In the first aspect of the invention, there is provided glass having optical constants of a refractive index (nd) of 1.79 or over and an Abbe number (vd) of 27 or over and a specific gravity (D) of 3.20 or over which is free from devitrification in the interior of the glass in a reheat test.

In the second aspect of the invention, there is provided glass as defined in the first aspect having chemical durability according to the Powder Method (acid-proof property RA according to the Powder Method) which is Class 1.

In the third aspect of the invention, there is provided glass having a composition comprising $SiO_2$, $TiO_2$ and $La_2O_3$ and a ratio of contents in mass % of $B_2O_3/SiO_2$ within a range from 0 to 0.5, and having optical constants of a refractive index (nd) of 1.79 or over and an Abbe number (vd) within a range from 27 to 35 wherein relation between the refractive index (nd) Y and specific gravity (D) X is $Y \geq 0.175X+1.137$.

In the fourth aspect of the invention, there is provided glass as defined in the third aspect comprising $\Sigma R_2O$ within a range from 0.1% to less than 15% in mass % and being free from opaqueness and devitrification when the glass is reheated and held at a temperature which is higher by 150° C. than glass transition temperature (Tg) for 30 minutes.

In the fifth aspect of the invention, there is provided glass as defined in any of the first to the fourth aspects wherein specific gravity (D) is within a range from 3.20 to 4.10.

In the sixth aspect of the invention, there is provided glass as defined in any of the first to the fifth aspects having a ratio of contents in mass % of $(BaO+SrO)/(TiO_2+Nb_2O_5)<0.80$.

In the seventh aspect of the invention, there is provided glass as defined in any of the first to the sixth aspects having a ratio of contents in mass % of $(SiO_2+Al_2O_3)/\Sigma R_2O>2.2$.

In the eighth aspect of the invention, there is provided glass as defined in any of the first to the seventh aspects comprising in mol %:

| | |
|---|---|
| $SiO_2$ | 30.0-48.0% |
| $TiO_2$ | 3.0-25.0% and |
| $La_2O_3$ | 0.5-15.0% |

In the ninth aspect of the invention, there is provided glass as defined in any of the first to the eighth aspects having optical constants of a refractive index (nd) within a range from 1.79 to 1.88 and an Abbe number (vd) within a range from 27 to 35 and comprising in mol %:

| | |
|---|---|
| $SiO_2$ | 30.0-48.0% |
| $TiO_2$ | 3.0-25.0% |
| $Nb_2O_5$ | 0.5-15.0% |
| $La_2O_3$ | 0.5-15.0% |
| $ZrO_2$ | 0.5-10.0% |
| $R_2O$ (R = Li, Na, K, Cs) | 0.5-25.0% |
| wherein | |
| $Li_2O$ | 0.0-23.0% and/or |
| $Na_2O$ | 0.0-15.0% and/or |
| $K_2O$ | 0.0-8.0% and/or |
| $Cs_2O$ | 0.0-5.0% and |
| RO(R = Mg, Ca, Sr, Ba) | 1.0-35.0% |
| wherein | |
| MgO | 0.0-7.0% and/or |
| CaO | 0.0-30.0% and/or |
| SrO | 0.0-8.0% and/or |
| BaO | 0.0-20% |
| wherein MgO + CaO | 0.0-31.0% and |
| $B_2O_3$ | 0.0-10.0% |
| $Al_2O_3$ | 0.0-3.0% and/or |
| ZnO | 0.0-10.0% and/or |
| $WO_3$ | 0.0-5.0% and/or |
| $Bi_2O_3$ | 0.0-3.0% and/or |
| $Gd_2O_3$ | 0.0-3.0% and/or |
| $Y_2O_3$ | 0.0-3.0% and/or |
| $Ta_2O_5$ | 0.0-3.0% and/or |
| $Yb_2O_3$ | 0.0-2.0% and/or |
| $Lu_2O_3$ | 0.0-2.0% and/or |
| $TeO_2$ | 0.0-2.0% and/or |
| $Sb_2O_3$ | 0.0-0.5% | and a fluoride or fluorides of a metal element or elements contained in the above metal oxides, a total amount of F contained in the fluoride or fluorides being 0-10%, and $B_2O/SiO_2=0-0.5$.

In the tenth aspect of the invention, there is provided glass as defined in any of the first to the ninth aspects having optical constants of a refractive index (nd) within a range from 1.79 to 1.88 and an Abbe number (vd) within a range from 27 to 35 and comprising in mass %:

| | |
|---|---|
| $SiO_2$ | 20.0-35.0% |
| $TiO_2$ | 1.0-less than 21.0% |
| $Nb_2O_5$ | 1.0-less than 25.0% |
| $La_2O_3$ | 5.0-less than 25.0% |
| $ZrO_2$ | 1.0-12.0% |
| $R_2O$ (R = Li, Na, K, Cs) | 0.1-less than 15.0% |
| wherein | |
| $Li_2O$ | 0.0-10.0% and/or |
| $Na_2O$ | 0.0-less than 7.0% and/or |
| $K_2O$ | 0.0-5.0% and/or |
| $Cs_2O$ | 0.0-5.0% and |
| RO(R = Mg, Ca, Sr, Ba) | 3.0-less than 30.0% |
| wherein | |
| MgO | 0.0-5.0% and/or |
| CaO | 0.0-less than 15.0% and/or |
| SrO | 0.0-10.0% and/or |
| BaO | 0.0-less than 25% |
| wherein MgO + CaO | 0.0-less than 16.0% and |
| $B_2O_3$ | 0.0-less than 6.0% |
| $Al_2O_3$ | 0.0-less than 1.0% and/or |
| ZnO | 0.0-10.0% and/or |
| $WO_3$ | 0.0-5.0% and/or |
| $Bi_2O_3$ | 0.0-5.0% and/or |
| $Gd_2O_3$ | 0.0-10.0% and/or |
| $Y_2O_3$ | 0.0-10.0% and/or |
| $Ta_2O_5$ | 0.0-10.0% and/or |
| $Yb_2O_3$ | 0.0-5.0% and/or |
| $Lu_2O_3$ | 0.0-5.0% and/or |
| $TeO_2$ | 0.0-3.0% and/or |
| $Sb_2O_3$ | 0.0-2.0% | and a fluoride or fluorides of a metal element or elements contained in the above metal oxides, a total amount of F contained in the fluoride or fluorides being 0-5%, and $B_2O_3/SiO_2=0-0.5$.

In the eleventh aspect of the invention, there is provided glass as defined in any of the first to the tenth aspects comprising $B_2O_3$ in an amount within a range from 0 to less than 2 mass %.

In the twelfth aspect of the invention, there is provided glass as defined in any of the first to the eleventh aspects comprising $Na_2O$ in an amount within a range from 0 to less than 3 weight %.

In the thirteenth aspect of the invention, there are provided optical elements including a lens and a prism comprising the glass defined in any of the first to the twelfth aspects as a basic material.

In the fourteenth aspect of the invention, there are provided optical elements including a lens and a prism made by reheat pressing the glass defined in any of the first to the twelfth aspects.

In the fifteenth aspect of the invention, there are provided optical substrate materials including a reflecting plate, diffusing plate and wavelength separating plate comprising the glass defined in any of the first to the twelfth aspects as a basic material.

In the sixteenth aspect of the invention, there are provided an optical instruments including a camera and a projector using an optical element or an optical substrate material comprising the glass defined in any of the first to the twelfth aspects.

In the seventeenth aspect of the invention, there is provided a preform for precision press molding made of the glass defined in any of the first to the twelfth aspects.

DESCRIPTION OF PREFERRED EMBODIMENTS

The glass of the first aspect of the invention has the effect of expanding the degree of freedom in the optical design. In the past, chromatic aberration has been reduced by adopting a complex processing for lens shaping represented by aspherical processing or by increasing the number of lenses used.

According to the glass of the invention, chromatic aberration can be reduced without processing a lens to a complex shape or increasing the number of the lens and, moreover, reheating processing such as reheat pressing can be applied to the glass of the invention easily. Accordingly, manufacturing cost of the optical glass can be significantly reduced. The reheat test herein means a test according to which a glass specimen in the form of a square pillar having width and thickness of 15 mm each and length of 30 mm is placed on a refractory material and reheated in an electric furnace to elevate the temperature in 150 minutes from room temperature to a set temperature which is in the vicinity of a temperature at which the glass is softened to such viscosity as enabling pressing of the glass, and then the temperature is lowered to room temperature and the glass specimen is taken out of the electric furnace and the interior of the glass specimen is observed by the eye through polished opposite surfaces of the specimen. When the interior of the glass is free from devitrification in the reheat test, it means that the glass can be processed easily by reheat pressing and, therefore, this is an essential property for the glass of the present invention. Assuming that reheat pressing is applied to the glass, the higher the set temperature of the reheat test, the lower becomes the viscosity of the glass and therefore the pressing force. Since, however, a high temperature deteriorates durability of the pressing mold, it is preferable to evaluate the glass by setting the reheating temperature within a range from +50° C. to +250° C. from the glass transition temperature and holding the glass specimen at this temperature for 5 minutes to 30 minutes.

In the glass of the second aspect of the invention, chemical durability according to the Powder Method (acid-proof property RA according to the Powder Method) is Class 1. By having this chemical durability, the quality of the glass hardly undergoes change when, for example, a weak acid or acid solution is used in rinsing a polished surface of glass or an optical glass.

In the glass of the third aspect of the invention, the composition of the glass is defined because, for achieving optical constants of a refractive index (nd) of 1.79 or over and an Abbe number (vd) within a range from 27 to 35, the glass needs to contain at least $SiO_2$ as a glass former, $TiO_2$ as a component for realizing a high refractive index and a low specific gravity, and $La_2O_3$ as a component for realizing a high refractive index and a large Abbe number.

The ratio of $B_2O_3/SiO_2$ is an important factor for determining chemical durability of the glass. Addition of $B_2O_3$ in a large amount causes serious deterioration in chemical durability and increase in devitrification in reheating of the glass. In the glass of the present invention, this ratio should preferably be 0.5 or below, more preferably be 0.45 or below and, most preferably be 0.4 or below.

When refractive index (nd) is designated by Y and specific gravity of glass by Y, the relation $Y \geq 0.17X+1.137$ means that the glass which satisfies this relation has a high refractive index and a low specific gravity. It is a general tendency that the larger the specific gravity of glass, the higher is refractive index of the glass. For example, in case the glass is used for products which are carried by hand such as a television camera and a digital cameras, the products should preferably be as light as possible. Even in a product which is not carried by hand, if specific gravity of glass is large, weight of the glass sometimes causes double refraction due to mechanical stress applied in the interior of the glass and, as a result, the quality of the product is deteriorated. By satisfying the above relation between X and Y, weight of a product can be reduced and double refraction due to weight of glass can mitigated and desired properties of the product thereby can be realized.

Therefore, in the third aspect of the invention, the relation $Y \geq 0.17X+1.137$ should be satisfied considering requirements for lower specific gravity and higher refractive index.

In the glass of the fourth aspect of the invention, a total amount in mass % of $R_2O$ (where R is Li, Na, K or Cs) should preferably be within a range from 0.1% to less than 15%. $R_2O$ is an indispensable component for the glass for lowering viscosity of glass melt and glass transition temperature during forming of the glass. If the total amount of $R_2O$ is insufficient, melting property of the glass is deteriorated and hence more thermal energy is required in producing the glass with resulting increase in the manufacturing cost. If the total amount of $R_2O$ is excessively large, desired optical constants cannot be achieved and, moreover, chemical durability of the glass is seriously deteriorated and devitrification and opaqueness are produced in the interior of the glass in a reheating process such as reheating pressing. Accordingly, the lower limit of the total amount of $R_2O$ ($\Sigma R_2O$) should preferably be 0.1 mass %, more preferably be 0.3 mass % and, most preferably be 0.5 mass % and the upper limit of $\Sigma R_2O$ should preferably be 15.0 mass %, more preferably be 14.0 mass % and, most preferably be 13.0 mass %.

The property of the glass that it is free from opaqueness and devitrification when the glass is reheated and held at a temperature which is higher by 150° C. than glass transition temperature for 30 minutes is a property necessary for realizing production of an optical element which is less expensive and has excellent productivity.

In the glass of the fifth aspect of the invention, the specific gravity of the glass should preferably be within a range from 3.20 to 4.10 for reducing weight of an optical instrument incorporating a lens or prism made of the glass and for mitigating double refraction due to weight of the glass.

In the glass of the sixth aspect of the invention, the ratio of contents in mass % of $(BaO+SrO)/(TiO_2+Nb_2O_5)$ is an important factor for realizing high refractive index and low specific gravity of the glass. BaO and SiO have an effect of increasing specific gravity when they are added in an excessively large amount. On the other hand, $TiO_2$ and $Nb_2O_5$ are effective for a high refractive index while they have low specific gravity. In the present invention, for satisfying the relation $Y \geq 0.17X+1.137$ while realizing desired optical constants, the ratio of contents in mass % of $(BaO+SrO)/(TiO_2+Nb_2O_5)$ should preferably be less than 0.80, more preferably be 0.78 or below and, most preferably, be 0.76 or below.

In the glass of the seventh aspect of the invention, the ratio of contents in mass % of $(SIO_2+Al_2O_3)/\Sigma R_2O$ is used as a standard for judging devitrification and chemical durability in the interior of the glass in the reheat test of the glass. $SiO_2$ and $Al_2O_3$ are glass forming components and also are components which are effective for preventing devitrification and improving chemical durability in the interior of the glass in the reheat test. On the other hand, $R_2O$ tends to cause devitrification and deteriorates chemical durability in the interior of the glass in the reheat test when it is added in an excessively large amount. If, therefore, this ratio of contents is large, devitrification can be prevented and chemical durability can be improved in the reheat test. Accordingly, in the present invention, the ratio of contents in mass % of $(SIO_2+Al_2O_3)/\Sigma R_2O$ should preferably be larger than 2.2, more preferably be 2.3 or larger and, most preferably be 2.5 or larger.

In the glasses of the eighth, ninth and tenth aspects of the invention, contents of the respective components are defined as described for the following reasons.

$SiO_2$ is an essential component as a glass forming oxide. If the amount of this component is less than 30 mol % and/or 20.0 mass %, a stable glass forming cannot be expected and a transparent glass cannot be produced. If the amount of this component exceeds 48.0 mol % and/or 35.0 mass %, a high refractive index of nd=1.79 or over cannot be realized. The lower limit of the amount of $SiO_2$, therefore, should preferably be 30.0 mol % and/or 20 mass %, more preferably be 30.5 mol % and/or 21.0 mass % and, most preferably be 31.0 mol % and/or 23.0 mass % and the upper limit of the amount of this component should preferably be 48.0 mol % and/or 35.0 mass %, more preferably be 47.5 mol % and/or 34.0 mass % and, most preferably be 47.0 mol % and/or 33.0 mass %. $SiO_2$ can be added in a desired raw material form. It should preferably be introduced in the form of an oxide ($SiO_2$), $K_2SiF_6$, or $Na_2SiF_6$.

$TiO_2$ is an essential component for achieving a low specific gravity and a high refractive index. If the amount of this component is less than 3.0 mol % and/or 1.0 mass %, a desired refractive index cannot be realized whereas if the amount of this component exceeds 25.0 mol % and/or 21.0 mass %, dispersion becomes excessively large and, as a result, a middle dispersion of vd=27 or over cannot be maintained and coloring of glass becomes so significant that high transmittance cannot be realized. Accordingly, the lower limit of the amount of $TiO_2$ should preferably be 3.0 mol % and/or 1.0 mass %, more preferably be 4.0 mol % and/or 3.0 mass % and, most preferably be 5.0 mol % and/or 5.0 mass % and the upper limit of tlis amount should preferably be 25.0 mol % and/or 21.0 mass %, more preferably be 24.5 mol % and/or 20.5 mass % and, most preferably be 24.0 mol % and/or 20.0 mass %. $TiO_2$ may be added in a desired raw material form. It should preferably be introduced in the form of an oxide ($TiO_2$).

$Nb_2O_5$, like $TiO_2$, is an essential component for achieving a low specific gravity and a high refractive index. If the amount of this component is less than 0.5 mol % andlor 1.0 mass % a desired refractive index cannot be realized whereas if the amount of this component exceeds 15.0 mol % and/or 18.0 mass %, dispersion becomes excessively large and, as a result, a middle dispersion of vd=27 or over cannot be maintained. Accordingly, the lower limit of the amount of $Nb_2O_5$ should preferably be 0.5 mol % and/or 1.0 mass %, more preferably be 0.8 mol % and/or 3.0 mass % and, most preferably be 1.0 mol % and/or 5.0 mass % and the upper linit of this amount should preferably be 15.0 mol % and/or 25.0 mass %, more preferably be 14.5 mol % and/or 23.0 mass % and, most preferably be 14.0 mol % and/or 18.0 mass %. $Nb_2O_5$ may be added in a desired raw material form. It should preferably be introduced in the form of an oxide ($Nb_2O_5$).

$La_2O_3$ is effective for decreasing dispersion while realizing a high refractive index and is an essential component for achieving Abbe number within a range from 27 to 35. If the amount of this component is 0.5 mol % or below and/or 5.0 mass % or below, a high refractive index and a middle dispersion cannot be achieved whereas if the amount of this component exceeds 15.0 mol % and/or 16.0 mass %, melting property of the glass is deteriorated and specific gravity becomes large. Accordingly, the lower limit of the amount of this component should preferably be 0.5 mol % and/or 5.0 mass %, more preferably be 0.8 mol % and/or 5.5 mass % and, most preferably be 1.0 mol % and/or 6.0 mass % and the upper limit of this component should preferably be 15.0 mol % and/or 25.0 mass %, more preferably be 14.5 mol % and/or 20.0 mass % and, most preferably be 14.0 mol % and/or 16.0 mass %. $La_2O_3$ may be added in a desired raw material form. It should preferably be introduced in the form of an oxide ($La_2O_3$), a nitrate or a nitrate hydrate ($La(NO_3)_3 \cdot XH_2O$ (where X is a desired integer).

$ZrO_2$ is an essential component, for it is effective for increasing stability of the glass, restraining occurrence of devitrification in the process of cooling the glass from a molten state, and improving chemical durability of the obtained glass. If the amount of this component is less than 0.5 mol % and/or 1.0 mass %, stability of the glass cannot be improved sufficiently whereas if the amount of this component exceeds 10.0 mol % and/or 12.0 mass %, melting property of the glass is deteriorated and a homogeneous glass cannot be obtained. Accordingly, the lower limit of the amount of $ZrO_2$ should preferably be 0.5 mol % and/or 1.0 mass %, more preferably be 0.8 mol % and/or 1.5 mass % and, most preferably be 1.0 mol % and/or 2.0 mass % and the upper limit of this amount should preferably be 10.0 mol % and/or 12.0 mass %, more preferably be 9.5 mol % and/or 11.0 mass % and, most preferably be 9.0 mol % andlor 10.0 mass %. $ZrO_2$ may be added in a desired raw material form. It should preferably be introduced in the form of an oxide ($ZrO_2$).

$R_2O$ (R=Li, Na, K, Cs) is an essential component, for it is effective for improving melting property of the glass and lowering viscosity of glass melt and glass transition temperature during forming of the glass. If the total amount of $R_2O$ is too small, melting property of the glass is deteriorated and, as a result, more thermal energy is required during production of the glass and the manufacturing cost thereby increases. If the total amount of $R_2O$ is excessively large, desired optical constants cannot be realized and, moreover, chemical durability of the obtained glass is significantly deteriorated and further opaqueness and devitrification occur in reheating process such as reheat pressing. Accordingly, the lower limit of the total amount of $R_2O$ should preferably be 0.5 mol % and/or 0.1 mass %, more preferably be 0.8 mol % and/or 0.3. mass % and, most preferably be 1.0 mol % and/or 0.5 mass % and the upper limit of the total amount of this component should preferably be 25.0 mol % and/or 15.0 mass %, more preferably be 24.5 mol % and/or 14.0 mass % and, most preferably be 24.0 mol % and/or 13.0 mass %.

Description will now be made about effects and preferred amount ranges of the respective component of $R_2O$.

$Li_2O$ is a component. which increases melting property of the glass more significantly than any other $R_2O$ components and may be optionally added depending upon the melting property of the glass composition. If, however, this component is added excessively, a high refractive index cannot be realized and opaqueness or precipitation of crystals occur during the reheating process. Accordingly, the upper limit of the amount of this component should preferably be 23.0 mol % and/or 10.0 mass %, more preferably be 22.0 mol % and/or 9.0 mass % and, most preferably be 21.0 mol % and/or 8.0 mass %. $Li_2O$ may be added in a desired raw material form. It should preferably be introduced in the form of a carbonate ($Li_2CO_3$) or a nitrate ($LiNO_3$).

$Na_2O$, like $Li_2O$, is a component which increases melting property of the glass and may be optionally added depending upon the melting property of the glass composition. If, however, this component is added excessively, a high refractive index and a middle dispersion cannot be realized and chemical durability of the glass is deteriorated. Accordingly, the upper limit of the amount of this component should preferably be 15.0 mol % and/or 7.0 mass %, more preferably be 14.0 mol % and/or 6.5 mass % and, most preferably be 13.0 mol % and/or 6.0 mass %. $Na_2O$ may be added in the form of a carbonate ($Na_2CO_3$), a nitrate ($NaNO_3$), a fluoride (NaF), $Na_2SiF_6$, $Na_3AlF_6$, NaCl, $Na_2SO_4$, $Na_2B_4O_7$, or $Na_2H_2Sb_2O_7 \cdot 5H_2O$. It should preferably be introduced in the form of a carbonate, a nitrate or a sulfate.

$K_2O$ is a component which can adjust a refractive index and Abbe number while adjusting melting property of the glass and may be optionally added. If, however, this component is added excessively, a high refractive index and a middle dispersion cannot be realized and specific gravity increases. Accordingly, the upper limit of the amount of this component should preferably be 8.0 mol % and/or 5.0 mass %, more preferably be 7.0 mol % and/or 4.5 mass % and, most preferably be 6.0 mol % and/or 4.0 mass %. $K_2O$ may be added in the form of a carbonate ($K_2CO_3$), a nitrate ($KNO_3$), a fluoride (KF), $K_2SiF_6$, $K_3TiF_6/H_2O$ or KI. It should preferably be introduced in the form of a carbonate or a nitrate.

$Cs_2O$, like $K_2O$, is a component which can adjust a refractive index and Abbe number while adjusting melting property of the glass and may be optionally added. If, however, this component is added excessively, a high refractive index and a middle dispersion cannot be realized and specific gravity increases. Accordingly, the upper limit of the amount of this component should preferably be 5.0 mol % and/or 5.0 mass %, more preferably be 4.5 mol % and/or 4.5 mass % and, most preferably be 4.0 mol % and/or 4.0 mass %. $Cs_2O$ may be added in a desired raw material form. It should preferably be introduced in the form of a carbonate ($Cs_2CO_3$) or a nitrate ($Cs_2NO_3$).

RO (Mg, Ca, Sr, Ba) is an essential component, for it is effective for decreasing dispersion while increasing a refractive index. If, however, the total amount of RO is too small, a desired high refractive index and middle dispersion cannot be realized whereas if the total amount of RO is excessively large, chemical durability is deteriorated and specific gravity increases. Accordingly, the lower limit of the total amount of RO should preferably be 1.0 mol % and/or 3.0 mass %, more preferably be 3.0 mol % and/or 4.0. mass % and, most preferably be 5.0 mol % and/or 5.0 mass % and the upper limit of the total amount of this component should preferably be 35.0 mol % and/or 30.0 mass %, more preferably be 33.0 mol % and/or 27.0 mass % and, most preferably be 31.0 mol % and/or 25.0 mass %.

Description will now be made about effects and preferred amount ranges of the respective component of RO.

MgO is effective for decreasing specific gravity while maintaining optical constants. If this component is added excessively, the glass becomes instable and crystals precipitate during the cooling process. Accordingly, the upper limit of the amount of this component should preferably be 7.0 mol % and/or 5.0 mass %, more preferably be 6.0 mol % and/or 4.0 mass % and, most preferably be 5.0 mol % and/or 3.0 mass %. MgO may be added in a desired raw material form. It should preferably be introduced in the form of an oxide (MgO), a carbonate ($MgCO_3$) or a hydroxide ($Mg(OH)_2$).

CaO is effective for reducing specific gravity and decreasing dispersion. If this component is added excessively, it becomes difficult to realize a high refractive index Accordingly, the upper limit of the amount of this component should preferably be 30.0 mol % and/or 15.0 mass %, more preferably be 29.0 mol % and/or 14.8 mass % and, most preferably be 28.0 mol % and/or 14.5 mass %. CaO may be added in a desired raw material form. It should preferably be introduced in the form of a carbonate ($CaCO_3$) or a fluoride ($CaF_2$).

The upper limit of the total amount of MgO and CaO should preferably be 31.0 mol % and/or 16.0 mass %. Addition of these components in excess of this upper limit makes it difficult to realize desired optical constants and therefore is not desirable. In the present invention, the upper limit of the two components should more preferably be 30.5 mol % and/or 15.5 mass % and, most preferably be 30.0 mol % and/or 15.0 mass %.

SrO is particularly effective for increasing a refractive index among RO components. If this component is added excessively, specific gravity of the glass increases and therefore it is not desirable. Accordingly, the upper limit of the amount of this component should preferably be 8.0 mol % and/or 10.0 mass %, more preferably be 7.5 mol % and/or 9.0 mass % and, most preferably be 7.0 mol % and/or 8.0 mass %. SrO may be added in a desired raw material form. It should preferably be introduced in the form of a nitrate ($Sr(NO_3)_2$) or a fluoride ($SrF_2$).

BaO is particularly effective for increasing a refractive index among RO components and may be added optionally. If this component is added excessively, specific gravity of the glass increases significantly and therefore it is not desirable. Accordingly, the upper limit of the amount of this component should preferably be 20.0 mol % and/or 25.0 mass %, more preferably be 19.0 mol % and/or 24.0 mass % and, most preferably be 18.0 mol % and/or 23.0 mass %. SrO may be added in a desired raw material form. It should preferably be introduced in the form of a carbonate ($BaCO_3$), a nitrate ($Ba(NO_3)_2$), a sulfate ($BaSO_4$) or a fluoride ($BaF_2$).

$B_2O_3$ is a type of glass forming oxide and also is effective for improving melting property of the glass by adding a proper amount thereof and, therefore, may be added as an optional component. If this component is added excessively, chemical durability is significantly deteriorated and, moreover, opaqueness and precipitation of crystals occur in the reheat processing. Accordingly, the upper limit of the amount of this component should preferably be 10.0 mol % and/or 6.0 mass %, more preferably be 6.0 mol % and/or 2.0 mass % and, most preferably, this component should not be added at all. $B_2O_3$ may be incorporated in the form of $H_3BO_3$, $Na_2B_4O_7$ and $Na_2B_4O_7 \cdot 10H_2O$ among which $H_3BO_3$ is the most preferably raw material.

$Al_2O_3$ is a type of glass forming oxide and also is effective for improving chemical durability of the glass significantly by adding a proper amount thereof If this component is added excessively, stability to devitrification is significantly deteriorated and, therefore, it becomes difficult to obtain glass having no inclusion in the interior of the glass. Accordingly, the upper limit of the amount of this component should preferably be 3.0 mol % and/or 1.0 mass %, more preferably be 2.5 mol % and/or 0.8 mass % and, most preferably be 2.0 mol % and/or 0.5 mass %. $Al_2O_3$ may be added in a desired raw material form. It should preferably be introduced in the form of an oxide ($Al_2O_3$), a hydroxide ($Al(OH)_3$) or $Na_3AlF_6$.

ZnO is effective for reducing improving melting property of the glass and increasing a refractive index and, therefore, may be optionally added. If this component is added excessively, opaqueness or precipitation of crystals occur in the reheating process. Accordingly, the upper limit of the amount of this component should preferably be 10.0 mol % and/or 10.0 mass %, more preferably be 9.0 mol % and/or 8.0 mass % and, most preferably be 8.0 mol % and/or 6.0 mass %. ZnO may be added in a desired raw material form. It should preferably be introduced in the form of an oxide (ZnO) or a fluoride ($ZnF_2$).

$WO_3$ is effective for improving melting property of the glass, preventing occurrence of devitrification in cooling of the melt, and achieving a high refractive index and, therefore, may be optionally added. If, however, this component is added excessively, dispersion increases to an excessive degree with resulting difficulty in achieving desired Abbe number and, moreover, coloring of the glass becomes significant. Accordingly, the upper limit of the amount of this component should preferably be 5.0 mol % and/or 5.0 mass %, more preferably be 4.5 mol % and/or 4.5 mass % and, most preferably be 4.0 mol % and/or 4.0 mass %. WO$_3$ may be added in a desired raw material form. It should preferably be introduced in the form of on an oxide (WO$_3$).

Bi$_2$O$_3$, like WO$_3$, is effective for improving melting property of the glass, preventing occurrence of devitrification in cooling of the melt, and achieving a high refractive index and, therefore, may be optionally added. If, however, this component is added excessively, dispersion increases to an excessive degree with resulting difficulty in achieving desired Abbe number and, moreover, coloring of the glass becomes significant. Accordingly, the upper limit of the amount of this component should preferably be 3.0 mol % and/or 5.0 mass %, more preferably be 2.5 mol % and/or 4.5 mass % and, most preferably be 2.0 mol % and/or 4.0 mass %. Bi$_2$O$_3$ may be added in a desired raw material form. It should preferably be introduced in the form of an oxide (Bi$_2$O$_3$).

Gd$_2$O$_3$ and Y$_2$O$_3$, like La$_2$O$_3$, are effective for achieving a high refractive index and a small dispersion and therefore may be optionally added. If, however, these components are added excessively, stability of the glass is significantly deteriorated with resulting difficulty in obtaining glass which is free from inclusions in the interior of the glass. Accordingly, the upper limit of the amount of the respective components should preferably be 3.0 mol % and/or 10.0 mass %, more preferably be 2.8 mol % and/or 9.0 mass % and, most preferably be 2.5 mol % and/or 8.0 mass %. Gd$_2$O$_3$ and Y$_2$O$_3$ may be added in a desired raw material form. They should preferably be introduced in the form of on an oxide (Gd$_2$O$_3$, Y$_2$O$_3$) or a fluoride (GdF$_3$, YF$_3$).

Ta$_2$O$_5$ is effective for achieving a high refractive index and preventing occurrence of devitrification in cooling of the melt and, therefore, may be optionally added. If, however, this component is added in an amount of 3.0 mol % or over and/or 10.0 mass % or over, dispersion increases to an excessive degree with resulting difficulty in achieving desired Abbe number and, moreover, it becomes difficult to produce the glass at a moderate cost because the raw material of this component is expensive. Accordingly, the upper limit of the amount of this component should preferably be 3.0 mol % and/or 10.0 mass %, more preferably be 2.8 mol % and/or 9.0 mass % and, most preferably be 2.5 mol % and/or 8.0 mass %. Ta$_2$O$_5$ may be added in a desired raw material form. It should preferably be introduced in the form of an oxide (Ta$_2$O$_5$).

Yb$_2$O$_3$ and Lu$_2$O$_3$ are effective for achieving a high refractive index and therefore may be optionally added. If, however, these components are added excessively, stability of the glass is deteriorated with resulting difficulty in obtaining glass which is free from inclusions in the interior of the glass and, moreover, it becomes difficult to produce the glass at a moderate cost because raw material of these components are expensive. Accordingly, the upper limit of the amount of the respective components should preferably be 2.0 mol % and/or 5.0 mass %, more preferably be 1.8 mol % and/or 4.0 mass % and, most preferably be 1.5 mol % and/or 3.0 mass %. Yb$_2$O$_3$ and Lu$_2$O$_3$ may be added in a desired raw material form. They should preferably be introduced in the form of an oxide (Yb$_2$O$_3$, Lu$_2$O$_3$).

TeO$_2$ is effective for achieving a high refractive index and, by adding a proper amount of this component, enhancing refining of the melt and, therefore, may be optionally added. If, however, this component is added excessively, the glass tends to become colored. Accordingly, the upper limit of the amount of this component should preferably be 2.0 mol % and/or 3.0 mass %, more preferably be 1.8 mol % and/or 2.0 mass % and, most preferably be 1.5 mol % and/or 1.0 mass %. TeO$_2$ may be added in a desired raw material form. It should preferably be introduced in the form of an oxide (TeO$_2$).

Sb$_2$O$_3$ is effective, by adding a proper amount of this component, for enhancing refining and defoaming of the melt and, therefore, may be optionally added. If, however, this component is added excessively, excessive bubbling occurs resulting in deterioration of the inside quality of the glass and, moreover, adversely affects a metal having high heat resistance (including an alloy) represented by platinum of a melting apparatus. Accordingly, the upper limit of the amount of this component should preferably be 0.5 mol % and/or 2.0 mass %, more preferably be 0.4 mol % and/or 1.5 mass % and, most preferably be 0.3 mol % and/or 1.0 mass % Sb$_2$O$_3$ may be added in a desired raw material form. It should preferably be introduced in the form of an oxide (Sb$_2$O$_3$ and Sb$_2$O$_5$) or Na$_2$H$_2$Sb$_2$O$_7$.5H$_2$O.

F component is effective for improving melting property of the glass and increasing Abbe number of the glass and, therefore, may be optionally added as a fluoride or fluorides of a metal element or elements contained in the above described metal oxides up to a total amount of F contained in the fluoride or fluorides being 10 mol % or 5 mass %. If, however, F component is added in an amount which is more than necessary, desired optical constants cannot be realized and, moreover, the internal quality of the glass is deteriorated and devitrification occurs in the reheat test. Accordingly, the upper limit of the amount of this component should preferably be 10.0 mol % and/or 5.0 mass %, more preferably be 9.0 mol % and/or 4.5 mass % and, most preferably be 8.0 mol % and/or 4.0 mass %. F component can be introduced in the glass in the form of a fluoride or fluorides as a raw material in introducing the various oxides.

The total amount of F in "a fluoride or fluorides of a metal element or elements contained in the above metal oxides or oxides, a total amount of F contained in the fluoride or fluorides" in this specification means, assuming that all oxides, complex salts, metal fluorides etc. used as raw materials of the glass composition are decomposed and converted to oxides during the melting process, a ratio of mass of F atoms expressed in mass % to a total mass of the produced oxides when the ratio is expressed in mass %, or a ratio of molar amount of actually contained F atoms expressed in mol % to a total molar amount of the produced oxides.

P$_2$O$_5$ may be added in an amount within a range in which advantageous results of the present invention are not impaired. Since addition of this component tends to enhance devitrification in the interior of the glass, the upper limit of the amount of this component should preferably be 10.0 mol % and/or 5.0 mass %. Most preferably, this component should not be added at all. P$_2$O$_5$ may be added in a desired raw material form. It should preferably introduced in the form of Al(PO$_3$)$_3$, Ba(PO$_3$)$_3$, BPO$_4$ or H$_3$PO$_4$.

In the present invention, the upper limit of the amount of lead and/or PbO and As$_2$O$_3$ should preferably be 0.01 mol % andlor 0.01 mass %, more preferably be 0.005 mol % and/or 0.005 mass % and, most preferably should not be added at all except for inevitable mixing of these components as impurities. Likewise, the upper limit of the amount of SnO$_2$ and SnO should preferably be 0.01 mol % and/or 0.01 mass %, more preferably be 0.005 mol % and/or 0.005 mass % and, most preferably should not be added at all.

Transition metal components such as V, Cr, Mn, Fe, Co, Ni, Cu, Ag and Mo, excluding Ti, tend to color the glass when these components are added solely or in combination even in a small amount with the result that absorption occurs in a specific wavelength in the visible region. Therefore, these components should preferably be not added substantially in an optical glass which uses a wavelength in the visible region. As to Ph, Th, Cd, Tl, As, Os, Be and Se, there is tendency to refraining from using these components as harmful chemical substance and, in case these components are used, steps must be taken for protecting the environment not only in glass manufacturing process but also in subsequent handling of the glass including processing of the glass to disposal of a product made of the glass. These components, therefore, should preferably be not added substantially if it is necessary to consider the influence to the environment.

In the glass of the eleventh aspect of the invention, by limiting the amount of $B_2O_3$ to 0—less than 2.0 mass %, effects of preventing devitrification in the reheat test and improving chemical durability can be obtained.

In the glass of the twelfth aspect of the invention, by limiting the amount of $Na_2O$ to 0—less than 3.0%, chemical durability can be improved.

As described in the thirteenth to seventeenth aspects of the invention, the glasses of the first to twelfth aspects of the invention are useful as a basic material of optical elements such as a lens and prism and optical substrate materials such as a reflecting plate, diffusing plate and wavelength separating plate. This glass is also useful as a material of a preform for precision press molding.

EXAMPLES

Examples of the glass according to the invention will now be described. In all of the following tables, amounts of components of the glass are expressed in mass %.

Tables 1 to 5 show compositions, refractive index (nd), Abbe number (vd), acid-proof property RA according to the Powder Method, specific gravity D and whether or not the example has passed the reheat test, of Examples No. 1 to No. 38 which are suitable for obtaining glass which has optical constants of a refractive index (nd) of 1.79 or over and an Abbe number (vd) of 27 or over and is free from devitrification in the interior of glass in the reheat test.

Table 6 shows various properties and results of evaluation of Comparative Examples A to J of known optical glasses. Comparative Examples A to D are Examples No. 2, 35, 39 and 40 of the above described Japanese Patent Application Laid-open Publication No. Sho 59-50048. Comparative Examples E to G are Examples No. 16, 34 and 41 of the above described Japanese Patent Application Laid-open Publication No. 2002-87841. Comparative Examples H and J are Examples No. 1 and 7 of the above described Japanese Patent Application Laid-open Publication No. Hei 3-5340. Comparative Example J is Example No. 4 of the above described Japanese Patent Application Laid-open Publication No. 2004-18371.

The acid-proof property RA(P) according to the Powder Method of the respective Examples and Comparative Examples was measured in the following manner in accordance with Japanese Optical Glass Industrial Standard JOGIS06[1999] Measuring Method of Chemical Durability of Optical Glass (Powder Method). Glasses of the Examples and Comparative Examples were crushed to pieces of a particle size within a range from 425 μm to 600 μm and the glass powder specimen thus obtained was put by a specific amount in a platinum dissolution basket. This dissolution basket containing the glass powder specimen was placed in a round bottom flask made of quartz glass containing 0.01N nitric acid aqueous solution. After treatment in boiling water for 60 minutes, reduction rate (%) of the glass powder specimen after the treatment was calculated. Class 1 indicates a case where the reduction rate is less than 0.06%, Class 2 indicates a case where the reduction rate is 0.05—less than 0.10%, and Class 3 indicates a case where the reduction rate is 0.10—less than 0.25%. Thus, the smaller the value of Class indicating RA(P), the higher the acid-proof property of the glass.

The reheat test was conducted in the following manner. The glass specimen in the form of a square pillar having width and thickness of 15 mm each and length of 30 mm was placed on a refractory material and reheated in an electric furnace to elevate the temperature in 150 minutes from room temperature to a temperature which was higher than the glass transition temperature (Tg) of the glass specimen by 150° C. and, after holding the glass specimen at this temperature for 30 minutes, the temperature was lowered to room temperature and the glass specimen was taken out of the electric furnace and the interior of the glass specimen was observed by the eye through polished opposite surfaces of the specimen. When the interior of the glass specimen was transparent, being free from devitrification in the reheat test, the result of the reheat test is marked as ○ whereas when opaqueness or devitrification was observed in the interior of the glass specimen, the result of the reheat test is marked by X.

The transition temperature of the optical glass of the Examples of the present invention was within a range from 560° C. to 700° C.

TABLE 1

| Compound (mass %) | Examples | | | | | |
|---|---|---|---|---|---|---|
| | 1 | 2 | 3 | 4 | 5 | 6 |
| $SiO_2$ | 28.75 | 28.75 | 27.1 | 27.1 | 25.75 | 25.75 |
| $B_2O_3$ | | | 4 | 4.5 | 4 | 4 |
| $Al_2O_3$ | | | | | | |
| $Y_2O_3$ | | | | 3.3 | | |
| $La_2O_3$ | 15.02 | 11.17 | 8.8 | 10.3 | 15.02 | 15.02 |
| $Gd_2O_3$ | | | | | | |
| $Yb_2O_3$ | | | | | | |
| $Lu_2O_3$ | | | | | | |
| $Bi_2O_3$ | | | | | | |
| $TiO_2$ | 16.96 | 18.96 | 14.5 | 12.5 | 14.96 | 14.96 |
| $ZrO_2$ | 4.54 | 4.54 | 6 | 6 | 9.54 | 9.54 |
| $Nb_2O_5$ | 7.47 | 7.47 | 17 | 16.5 | 7.47 | 9.47 |
| $Ta_2O_5$ | | | | | | |
| $WO_3$ | | | | | | |
| ZnO | | | 2.5 | 1 | | |
| MgO | | | | | | |
| CaO | 6.42 | 1.42 | 8 | 10 | 14.41 | 14.41 |
| SrO | | | 2 | 2 | 2 | |
| BaO | 12.99 | 19.99 | | | | |
| $Li_2O$ | 1.09 | 1.09 | 6.6 | 6.6 | 3.09 | 4.75 |

TABLE 1-continued

| Compound (mass %) | 1 | 2 | 3 | 4 | 5 | 6 |
|---|---|---|---|---|---|---|
| Na2O | 4.44 | 4.44 | | | | |
| K2O | 2.22 | 2.22 | 3.3 | | 3.66 | 2 |
| Cs2O | 0.1 | | | | | |
| Sb2O3 | | 0.1 | 0.1 | 0.1 | 0.1 | 0.1 |
| TeO2 | | | | | | |
| TOTAL | 100 | 100.15 | 99.9 | 99.9 | 100 | 100 |
| nd | 1.79394 | 1.79796 | 1.7992 | 1.80778 | 1.79782 | 1.80859 |
| vd | 31.3 | 29.8 | 27.3 | 32.1 | 32.8 | 32.3 |
| RA(P) | 1 | 1 | 1 | 1 | 1 | 1 |
| d | 3.68 | 3.7 | 3.39 | 3.48 | 3.51 | 3.5 |
| reheat test | ○ | ○ | ○ | ○ | ○ | ○ |
| Glass transition temperature Tg(° C.) | | 634 | | | | |
| B2O3/SiO2 比 | 0 | 0 | 0.15 | 0.17 | 0.16 | 0.16 |
| Σ R2O | 2.32 | 7.75 | 9.9 | 6.6 | 6.75 | 6.75 |
| Σ RO | 18.52 | 21.41 | 10 | 12 | 16.41 | 14.41 |
| (BaO + SrO)/(TiO2 + Nb2O5) | 0.532 | 0.756 | 0.063 | 0.069 | 0.089 | 0 |
| (SiO2 + Al2O3)/Σ R2O | 12.39 | 3.71 | 2.74 | 4.11 | 3.81 | 3.81 |
| Y | 1.781 | 1.7845 | 1.73025 | 1.746 | 1.75125 | 1.7495 |
| Y-nd | −0.013 | −0.013 | −0.069 | −0.062 | −0.047 | −0.059 |

TABLE 2

| Compound (mass %) | 7 | 8 | 9 | 10 | 11 | 12 | 13 | 14 | 15 |
|---|---|---|---|---|---|---|---|---|---|
| SiO2 | 27.1 | 26.75 | 26.75 | 27.45 | 26.45 | 27.1 | 27.45 | 27.45 | 27.45 |
| B2O3 | 4.5 | 4 | 2 | | 1 | 4.5 | 1 | 1 | 0.5 |
| Al2O3 | | | | | | | | | |
| Y2O3 | | | | | | | | | |
| La2O3 | 8.8 | 12.02 | 12.02 | 16.72 | 14.72 | 8.8 | 13.72 | 17.72 | 18.22 |
| Gd2O3 | | | | | | | | | |
| Yb2O3 | | | | | | | | | |
| Lu2O3 | | | | | | | | | |
| Bi2O3 | | | | | | | | | |
| TiO2 | 14.6 | 12.96 | 12.96 | 16 | 16 | 14.5 | 16 | 14 | 12 |
| ZrO2 | 6 | 9.54 | 9.54 | 5.74 | 5.74 | 6 | 7.74 | 5.74 | 5.74 |
| Nb2O5 | 14 | 11.47 | 11.47 | 9.64 | 13.64 | 16.5 | 13.64 | 15.64 | 17.64 |
| Ta2O5 | | | | | | | | | |
| WO3 | | | | | | 2.5 | | | |
| ZnO | 2.5 | 2 | 2 | | 2 | | | 1 | 1 |
| MgO | | | | | | | | | |
| CaO | 13.8 | 14.41 | 14.41 | 4.45 | 9.4 | 3 | 9.4 | 14.4 | 14.4 |
| SrO | 2 | | | | 5 | 2 | 5 | | |
| BaO | | | | 19 | 5 | 8.3 | 5 | 2 | 2 |
| Li2O | 6.6 | 4.75 | 4.75 | 1 | 1 | 6.6 | 1 | 1 | 1 |
| Na2O | | | | | | | | | |
| K2O | | 2 | 2 | | | | | | |
| Cs2O | | | 2 | | | | | | |
| Sb2O3 | 0.1 | 0.1 | 0.1 | 0.05 | 0.05 | 0.1 | 0.05 | 0.05 | 0.05 |
| TeO2 | | | | | | | | | |
| TOTAL | 100 | 100 | 100 | 100.05 | 100 | 99.9 | 100 | 100 | 100 |
| nd | 1.80469 | 1.79806 | 1.79352 | 1.84619 | 1.86012 | 1.81942 | 1.85537 | 1.85256 | 1.85084 |
| vd | 31.9 | 32.9 | 32.9 | 30 | 29.2 | 29.7 | 29.2 | 30.2 | 30.8 |
| RA(P) | 1 | 1 | 1 | 1 | 1 | 1 | 1 | 1 | 1 |
| d | 3.42 | 3.47 | 3.47 | 4 | 3.86 | 3.58 | 3.81 | 3.78 | 3.82 |
| reheat test | ○ | ○ | ○ | ○ | ○ | ○ | ○ | ○ | ○ |
| Glass transition temperature Tg(° C.) | 570 | | | | | 553 | | 688 | |
| B2O3/SiO2 | 0.17 | 0.15 | 0.07 | 0 | 0.04 | 0.17 | 0.04 | 0.04 | 0.02 |
| Σ R2O | 6.6 | 6.75 | 6.75 | 1 | 1 | 6.6 | 1 | 1 | 1 |
| Σ RO | 15.8 | 14.41 | 14.41 | 23.45 | 19.4 | 13.3 | 19.4 | 16.4 | 16.4 |
| (BaO + SrO)/(TiO2 + Nb2O5) | 0.07 | 0 | 0 | 0.741 | 0.337 | 0.332 | 0.337 | 0.067 | 0.067 |
| (SiO2 + Al2O3)/Σ R2O | 4.11 | 3.96 | 3.96 | 27.45 | 26.45 | 4.11 | 27.45 | 27.45 | 27.45 |
| Y | 1.7355 | 1.74425 | 1.74425 | 1.837 | 1.8125 | 1.7635 | 1.80375 | 1.7985 | 1.8055 |
| Y-nd | −0.069 | −0.054 | −0.049 | −0.009 | −0.048 | −0.056 | −0.052 | −0.054 | −0.045 |

TABLE 3

| Compound (mass %) | 16 | 17 | 18 | 19 | 20 | 21 | 22 | 23 | 24 |
|---|---|---|---|---|---|---|---|---|---|
| SiO2 | 30.1 | 28.1 | 30.5 | 28.1 | 27.45 | 27.45 | 25.45 | 27 | 26.5 |
| B2O3 | | 2 | 1.4 | 2 | 1 | 1 | 1 | 1.2 | |
| Al2O3 | | | | | | | 0.6 | 0.45 | 0.5 |
| Y2O3 | | 2 | | | | | | | |
| La2O3 | 10.9 | 9.9 | 9 | 7 | 17.72 | 15.52 | 18.8 | 15.72 | 12.4 |
| Gd2O3 | | | | | | | | | |
| Yb2O3 | | | | | | | | | 1 |
| Lu2O3 | | | | | | | | | |
| Bi2O3 | | | | | | | | | |
| TiO2 | 11.5 | 12.5 | 12.5 | 11.5 | 14 | 13.64 | 13.8 | 14 | 12 |
| ZrO2 | 6 | 6 | 5 | 6 | 5.74 | 5.94 | 5.76 | 5.24 | 6 |
| Nb2O5 | 19.5 | 15.5 | 19 | 19.5 | 15.64 | 18 | 16.34 | 15.84 | 19.7 |
| Ta2O5 | | | | | | | | | |
| WO3 | | | | | | | | 0.5 | 0.95 |
| ZnO | 2.5 | 2.5 | 3 | 5.8 | 1 | 1.4 | 1.3 | 2.5 | |
| MgO | | | 1.5 | | | | | | 1 |
| CaO | 9.5 | 9.5 | 10 | | 12.4 | 11 | 14.9 | 14 | 13.4 |
| SrO | 3.6 | 3.6 | | 3 | | | | | 3.5 |
| BaO | 3.3 | 6.3 | 3.5 | 3 | 2 | 3 | | 2.5 | 2 |
| Li2O | 3 | 2 | | | | 0.5 | | 1 | 1 |
| Na2O | | | 4.5 | 4 | 3 | 2.5 | 2 | | 1 |
| K2O | | | | | | | | | |
| Cs2O | | | | | | | | | |
| Sb2O3 | 0.1 | 0.1 | 0.1 | 0.05 | 0.05 | 0.05 | 0.05 | | 0.05 |
| TeO2 | | | | 0.05 | | | | 0.05 | |
| TOTAL | 100 | 100 | 100 | 100 | 100 | 100 | 100 | 100 | 100 |
| nd | 1.82937 | 1.82696 | 1.79938 | 1.81129 | 1.83639 | 1.84279 | 1.85309 | 1.85057 | 1.84934 |
| vd | 30.6 | 31 | 30.3 | 30 | 30 | 29.3 | 30 | 29.9 | 30 |
| RA(P) | 1 | 1 | 1 | 1 | 1 | 1 | 1 | 1 | 1 |
| d | 3.7 | 3.74 | 3.55 | 3.64 | 3.74 | 3.74 | 3.79 | 3.77 | 3.79 |
| reheat test | ○ | ○ | ○ | ○ | ○ | ○ | ○ | ○ | ○ |
| Glass transition temperature Tg(° C.) | | | | | | | | | |
| B2O3/SiO2 | 0 | 0.07 | 0.05 | 0.07 | 0.04 | 0.04 | 0.04 | 0.04 | 0 |
| Σ R2O | 3 | 2 | 4.5 | 4 | 3 | 3 | 2 | 1 | 2 |
| Σ RO | 16.4 | 19.4 | 15 | 16 | 14.4 | 14 | 14.9 | 16.5 | 18.9 |
| (BaO + SrO)/(TiO2 + Nb2O5) | 0.223 | 0.354 | 0.111 | 0.194 | 0.067 | 0.095 | 0 | 0.084 | 0.174 |
| (SiO2 + Al2O3)/Σ R2O | 10.03 | 14.05 | 6.78 | 7.03 | 9.15 | 9.15 | 13.03 | 27.45 | 13.5 |
| Y | 1.7845 | 1.7915 | 1.75825 | 1.774 | 1.7915 | 1.7915 | 1.80025 | 1.79675 | 1.80025 |
| Y-nd | −0.045 | −0.035 | −0.041 | −0.037 | −0.045 | −0.051 | −0.053 | −0.054 | −0.049 |

TABLE 4

| Compound (mass %) | 25 | 26 | 27 | 28 | 29 | 30 | 31 | 32 | 33 |
|---|---|---|---|---|---|---|---|---|---|
| SiO2 | 24.45 | 25 | 27 | 27.5 | 26.5 | 27.2 | 27.2 | 27.45 | 27.2 |
| B2O3 | 4 | 4 | | | | | | | 0.5 |
| Al2O3 | | | | 0.8 | 0.5 | 0.5 | | | |
| Y2O3 | | | | | | | | 3 | 3 |
| La2O3 | 17.72 | 9.8 | 12.8 | 9.5 | 10.4 | 12.6 | 12.6 | 13.72 | 12.6 |
| Gd2O3 | | | 3 | | | | 3 | | |
| Yb2O3 | | | | | | | | 1 | |
| Lu2O3 | | | | 2 | | | | | |
| Bi2O3 | | | | | 1 | | 1 | | |
| TiO2 | 14 | 10 | 12.9 | 10 | 12 | 12.9 | 12.9 | 14 | 12.9 |
| ZrO2 | 5.74 | 5 | 4.9 | 5.12 | 6 | 5.6 | 4.9 | 5.74 | 4.9 |
| Nb2O5 | 15.64 | 22.2 | 17.7 | 18.6 | 18.7 | 17 | 16.7 | 15.64 | 17.7 |
| Ta2O5 | | | | | 3 | 3 | | | |
| WO3 | | 2 | 0.9 | 4.1 | 0.95 | 0.95 | 0.95 | | 0.95 |
| ZnO | 1 | | 2 | | | 2 | 2 | 2 | 2 |
| MgO | | | | | | | | | |
| CaO | 14.4 | 9 | 13.2 | 8 | 13.4 | 13.7 | 13.2 | 14.4 | 12.2 |
| SrO | | 4.1 | 1 | 3.8 | 3.5 | | 1 | | |
| BaO | 2 | 5.12 | 2 | 6 | 2 | 3 | 2 | 2 | 3 |
| Li2O | 1 | | 1 | | 1 | 1.5 | 1 | 1 | 1 |

TABLE 4-continued

| Compound (mass %) | 25 | 26 | 27 | 28 | 29 | 30 | 31 | 32 | 33 |
|---|---|---|---|---|---|---|---|---|---|
| Na2O | | 3.7 | 1.5 | 4.5 | 1 | | 1.5 | | 1 |
| K2O | | | | | | | | | |
| Cs2O | | | | | | | | | |
| Sb2O3 | 0.05 | 0.08 | 0.1 | 0.08 | 0.05 | 0.05 | 0.05 | 0.05 | 0.05 |
| TeO2 | | | | | | | | | |
| TOTAL | 100 | 100 | 100 | 100 | 100 | 100 | 100 | 100 | 100 |
| nd | 1.8539 | 1.82039 | 1.848 | 1.81262 | 1.85027 | 1.85288 | 1.84663 | 1.85699 | 1.84752 |
| vd | 30.1 | 29.9 | 30 | 29.9 | 29.6 | 29.7 | 30 | 30.2 | 30.1 |
| RA(P) | 1 | 1 | 1 | 1 | 1 | 1 | 1 | 1 | 1 |
| d | 3.77 | 3.72 | 3.82 | 3.76 | 3.79 | 3.81 | 3.81 | 3.81 | 3.78 |
| reheat test | ○ | ○ | ○ | ○ | ○ | ○ | ○ | ○ | ○ |
| Glass transition temperature Tg(° C.) | | | 667 | | 685 | | | | |
| B2O3/SiO2 | 0.16 | 0.16 | 0 | 0 | 0 | 0 | 0 | 0 | 0 |
| Σ R2O | 1 | 3.7 | 2.5 | 4.5 | 2 | 1.5 | 2.5 | 1 | 3 |
| Σ RO | 16.4 | 18.22 | 16.2 | 17.8 | 18.9 | 16.7 | 16.2 | 16.4 | 15.2 |
| (BaO + SrO)/(TiO2 + Nb2O5) | 0.067 | 0.286 | 0.098 | 0.343 | 0.179 | 0.1 | 0.101 | 0.067 | 0.098 |
| (SiO2 + Al2O3)/Σ R2O | 24.45 | 6.76 | 10.8 | 6.29 | 13.5 | 18.47 | 10.88 | 27.45 | 9.23 |
| Y | 1.79675 | 1.788 | 1.8055 | 1.795 | 1.80025 | 1.80375 | 1.80375 | 1.80375 | 1.7985 |
| Y-nd | −0.057 | −0.032 | −0.043 | −0.018 | −0.05 | −0.049 | −0.043 | −0.053 | −0.049 |

TABLE 5

| Compound(mass %) | 34 | 35 | 36 | 37 | 38 |
|---|---|---|---|---|---|
| SiO2 | 26.7 | 28.65 | 28.75 | 28.79 | 28 |
| B2O3 | | | | | 4.5 |
| Al2O3 | 0.5 | | | | |
| Y2O3 | | | | | |
| La2O3 | 12.6 | 11.17 | 6.17 | 8.67 | 8.8 |
| Gd2O3 | 3 | | 5 | | |
| Yb2O3 | | | | | |
| Lu2O3 | | | | | |
| Bi2O3 | | | | | |
| TiO2 | 12.9 | 18.96 | 18.96 | 16.96 | 14.5 |
| ZrO2 | 4.9 | 4.54 | 4.54 | 6 | 6 |
| Nb2O5 | 17.7 | 7.47 | 7.47 | 8.97 | 18 |
| Ta2O5 | | | | | |
| WO3 | 0.95 | | | | 1.5 |
| ZnO | 2 | | | 5 | |
| MgO | | | | | |
| CaO | 13.2 | 1.42 | 3.92 | 3.01 | 4 |
| SrO | 1 | | | | 2 |
| BaO | 2 | 19.99 | 17.41 | 14.91 | 6 |
| Li2O | 1 | 1.59 | 1.59 | 1.5 | 6.6 |
| Na2O | 1.5 | 2.44 | 2.44 | 2.44 | |
| K2O | | 3.72 | 3.72 | 3.72 | |
| Cs2O | | | | | |
| Sb2O3 | 0.05 | 0.05 | 0.03 | 0.03 | 0.1 |
| TeO2 | | | | | |
| TOTAL | 100 | 100 | 100 | 100 | 100 |
| nd | 1.8467 | 1.8034 | 1.80118 | 1.79991 | 1.81889 |
| vd | 30 | 29.7 | 29.8 | 29.9 | 29.6 |
| RA(P) | 1 | 1 | 1 | 1 | 1 |
| d | 3.8 | 3.72 | 3.69 | 3.68 | 3.52 |
| Reheat test | ○ | ○ | ○ | ○ | ○ |
| Glass transition temperature Tg (° C.) | | 627 | 627 | 608 | 561 |
| B2O3/SiO2 | 0 | 0 | 0 | 0 | 0.16 |
| Σ R2O | 2.5 | 7.75 | 7.75 | 7.66 | 6.6 |
| Σ RO | 16.2 | 21.41 | 21.33 | 17.92 | 12 |
| (BaO + SrO)/(TiO2 + Nb2O5) | 0.098 | 0.756 | 0.659 | 0.575 | 0.246 |
| (SiO2 + Al2O3)/Σ R2O | 10.88 | 3.7 | 3.71 | 3.76 | 4.24 |
| Y | 1.802 | 1.788 | 1.78275 | 1.781 | 1.753 |
| Y- nd | −0.045 | −0.015 | −0.018 | −0.019 | −0.066 |

TABLE 6

| mass % | Comparative Examples | | | | | | | | | |
|---|---|---|---|---|---|---|---|---|---|---|
| | A | B | C | D | E | F | G | H | I | J |
| $SiO_2$ | 23 | 20 | 23 | 18 | 27 | 32 | 27 | 12.6 | 15.6 | 5 |
| $B_2O_3$ | 2 | 4 | 6 | 6 | 2 | | 2 | 13 | 10 | 19 |
| $Al_2O_3$ | | | | | | | | | | |
| $Y_2O_3$ | | | | | | | | | | |
| $La_2O_3$ | 20 | 12 | 6 | 20 | | | | 24.6 | 19.6 | 45 |
| $Gd_2O_3$ | | | | | | | | | | |
| $Yb_2O_3$ | | | | | | | | | | |
| $Lu_2O_3$ | | | | | | | | | | |
| $Bi_2O_3$ | | | | | | | | | | |
| $TiO_2$ | 12 | 12 | 12 | 16 | 15 | 22 | 15 | 10 | 10 | 10 |
| $ZrO_2$ | 5 | 3 | 4 | 4 | | 2 | | 2 | 7 | 2 |
| $Nb_2O_5$ | 10 | 15 | 16 | 9 | 38 | 20 | 39 | 18.5 | 18.5 | 8 |
| $Ta_2O_5$ | | | | | | | | | | |
| $WO_3$ | | | | | | | | | | |
| ZnO | | | | | | | | | | 6 |
| MgO | | | | | | 1 | | | | |
| CaO | | | | | | | | 17.3 | 17.5 | |
| SrO | | 5 | | | | | 1 | | | |
| BaO | 26 | 20 | 26 | 25 | | 6 | | | | 2 |
| $Li_2O$ | | | | | 4 | 5 | 3 | 2 | 1.8 | |
| $Na_2O$ | 2 | 5 | 5 | 2 | 3 | 6 | 12 | | | 3 |
| $K_2O$ | | 4 | 2 | | 11 | 7 | | | | |
| $Cs_2O$ | | | | | | | | | | |
| $Sb_2O_3$ | | | | | | | | | | 0.3 |
| $TeO_2$ | | | | | | | | | | |
| TOTAL | 100 | 100 | 100 | 100 | 100 | 100 | 100 | 100 | 100 | 100.3 |
| nd | 1.83083 | 1.80895 | 1.79034 | 1.85716 | 1.81023 | 1.78119 | 1.83149 | 1.84745 | 1.85357 | 1.85698 |
| vd | 31.6 | 29.4 | 30.2 | 29.3 | 25 | 27.1 | 24.4 | 32.4 | 31.7 | 33.1 |
| RA(P) | 1 | 2 | 2 | 1 | 1 | 1 | 1 | 3 | 2 | 3 |
| d | 4.22 | 3.89 | 3.79 | 4.19 | 3.23 | 3.19 | 3.33 | 3.81 | 3.79 | 4.34 |
| reheat test | ○ | X | ○ | ○ | X | X | X | ○ | ○ | ○ |
| Glass transition temperature Tg (° C.) | 716 | 585 | 620 | 670 | 525 | 527 | 537 | 593 | 611 | 561 |
| $B_2O_3/SiO_2$ | 0.09 | 0.2 | 0.26 | 0.33 | 0.07 | 0 | 0.07 | 1.03 | 0.64 | 3.8 |
| Σ $R_2O$ | 2 | 9 | 7 | 2 | 18 | 18 | 15 | 2 | 1.8 | 3 |
| Σ RO | 26 | 25 | 26 | 25 | 0 | 6 | 2 | 17.3 | 17.5 | 2 |
| (BaO + SrO)/ (TiO2 + Nb2O5) | 1.182 | 0.926 | 0.929 | 1 | 0 | 0.143 | 0.019 | 0 | 0 | 0.111 |
| (SiO2 + Al2O3)/ Σ R2O | 11.5 | 2.22 | 3.29 | 9 | 1.5 | 1.78 | 1.8 | 6.3 | 8.67 | 1.67 |
| Y | 1.876 | 1.818 | 1.8 | 1.87 | 1.702 | 1.695 | 1.72 | 1.804 | 1.8 | 1.897 |
| Y-nd | 0.045 | 0.009 | 0.01 | 0.013 | −0.108 | −0.086 | −0.112 | −0.044 | −0.053 | 0.04 |

For producing the glasses of the Examples No. 1 to 38 shown in Tables 1 to 5, ordinary raw materials for optical glasses such as oxides, carbonates, nitrates, fluorides, hydroxides and metaphosphate compounds were weighed and mixed at a predetermined ratio and mixed materials were put in a platinum crucible and melted at a temperature within a range from 1200° C. to 1400° C. for three to four hours depending upon the melting property of the glass composition. The melt was stirred and thereby homogenized and then, after the temperature was lowered to a proper temperature, the melt was cast into a mold and annealed to provide the glass.

As shown in Tables 1 to 5, the glasses of Examples of the present invention have desired optical constants, excellent chemical durability and are free from devitrification in the reheat test. In contrast, the glasses of Comparative Examples A to D and J shown in Table 6 has a large specific gravity and do not satisfy the relation Y≧0.175X+1.137 and, therefore, are inferior to the Examples of the present invention from the standpoint of reducing the weight of a product. The glasses of Comparative Examples B and E to G have produced devitrification in the reheat test and it has been found that these glasses will encounter difficulty in reheat pressing. The glasses of Comparative Examples H to J show acid-proof property of Class 2 and Class 3 exhibiting that they have poor chemical durability.

As has been described in the foregoing, according to the present invention, an optical glass having optical constants of a refractive index (nd) of 1.79 or over and an Abbe number (vd) of 27 or over, being suitable for reheat processing represented by reheat pressing and having excellent chemical durability can be manufactured at a moderate cost and, therefore, optical design can be realized with a high degree of freedom and optical elements such as a lens, a prism and a reflecting plate having excellent properties and optical instruments using such optical elements can be provided.

INDUSTRIAL APPLICABILITY

The glass of the present invention is suitable for use as optical elements such as prisms, lenses including a lens for an optical pick-up and a lens for spectacles and optical substrates such as a reflecting plate, a diffusing plate, a polarizer and a cover glass.

The invention claimed is:
1. Glass comprising, in mass %,

| | |
|---|---|
| SiO$_2$ | 20.0-35.0% |
| TiO$_2$ | 1.0-less than 21.0% |
| La$_2$O$_3$ | 5.0-less than 25% |
| CaO | 0.0-less than 15.0 % |
| MgO + CaO | 0.0-less than 16.0% |

ΣR$_2$O (R is at least one selected from Li, Na, K and Cs) 0.1—less than 15.0%
Li$_2$O in a range from 0 to 4.75 mass %, and
Nb$_2$O$_5$ in a range from 0 to 13.64 mass %,
wherein a ratio of contents in mass % of B$_2$O$_3$/SiO$_2$ is within a range from 0 to 0.5,
wherein said glass has
   optical constants of a refractive index (nd) of 1.79 or over,
   an Abbe number (vd) of 27 to 35 and a specific gravity (D) of 3.20 or over, and
   chemical durability of Class 1 according to the Powder Method (acid-proof property RA according to the Powder Method),
wherein relation between the refractive index (nd) Y and specific gravity (D) X is $Y \geq 0.175X + 1.137$, and wherein said glass is free from devitrification in the interior of the glass in a reheat test.

2. Glass as defined in claim 1, wherein the glass is free from opaqueness and devitrification when the glass is reheated and held at a temperature which is higher by 150° C. than glass transition temperature (Tg) for 30 minutes.

3. Glass as defined in claim 1 wherein specific gravity (D) is within a range from 3.20 to 4.10.

4. Glass as defined in claim 1 having a ratio of contents in mass % of (BaO+SrO)/(TiO$_2$+Nb$_2$O$_5$)<0.80.

5. Glass as defined in claim 1 having a ratio of contents in mass of (SiO$_2$+Al$_2$O$_3$)/ΣR$_2$O>2.2, wherein R is at least one selected from Li, Na, K, and Cs.

6. Glass as defined in claim 1 having optical constants of a refractive index (nd) within a range from 1.79 to 1.88 and an Abbe number (vd) within a range from 27 to 35 and comprising in mass %:

| | |
|---|---|
| ZrO$_2$ | 1.0-12.0%, |

ΣRO 3.0-less than 30.0% (R is at least one selected from Mg, Ca, Sr, and Ba),
wherein the RO comprises

| | |
|---|---|
| MgO | 0.0-5.0%, |
| CaO | 0.0-less than 15.0%, |
| SrO | 0.0-10.0%, and |
| BaO | 0.0-less than 25%, |
| B$_2$O$_3$ | 0.0-less than 6.0% |
| Al$_2$O$_3$ | 0.0-less than 1.0%, |
| ZnO | 0.0-10.0%, |
| WO$_3$ | 0.0-5.0%, |
| Bi$_2$O$_3$ | 0.0-5.0%, |
| Gd$_2$O$_3$ | 0.0-10.0%, |
| Y$_2$O$_3$ | 0.0-10.0%, |
| Ta$_2$O$_5$ | 0.0-10.0%, |
| Yb$_2$O$_3$ | 0.0-5.0%, |
| Lu$_2$O$_3$ | 0.0-5.0%, |
| TeO$_2$ | 0.0-3.0%, |
| Sb$_2$O$_3$ | 0.0-2.0%, and | a total amount of fluorine of fluoride of at least one metal element contained in the above metal oxides 0.0-5%,
wherein the R$_2$O comprises

| | |
|---|---|
| Li$_2$O | 0 to 4.75% |
| Na$_2$O | 0.0-less than 7.0%, |
| K$_2$O | 0.0-5.0%, |
| Cs$_2$O | 0.0-5.0%. |

7. Glass as defined in claim 1 comprising Na$_2$O in an amount within a range from 0 to less than 3 weight %.

8. The glass defined in claim 1 wherein the glass is included as a basic material in an optical element.

9. The glass defined in claim 1, wherein the glass is made by reheat pressing and included in an optical element.

10. The glass defined in claim 1, wherein the glass is included as a basic material in an optical substrate.

11. The glass defined in claim 9 or 10, wherein the glass is included in a camera or a projector.

12. The glass defined in claim 1, wherein the glass is included in a preform for precision press molding.

13. The glass defined in claim 8 or 9, wherein the optical element is a lens or a prism.

14. The glass defined in claim 10, wherein the optical substrate is a reflecting plate, diffusing plate or wavelength separating plate.

* * * * *